(12) United States Patent
O'Neill (10) Patent No.: US 9,907,345 B2
(45) Date of Patent: Mar. 6, 2018

(54) MAGNET AND FRICTION BASED INFINITELY VARIABLE STRAP TIGHTENING SYSTEM AND METHOD

(71) Applicant: Devin O'Neill, Denver, CO (US)

(72) Inventor: Devin O'Neill, Denver, CO (US)

(*) Notice: Subject to any disclaimer, the term of this patent is extended or adjusted under 35 U.S.C. 154(b) by 385 days.

(21) Appl. No.: 14/544,816

(22) Filed: Feb. 20, 2015

(65) Prior Publication Data

US 2015/0237938 A1 Aug. 27, 2015

Related U.S. Application Data

(60) Provisional application No. 61/942,702, filed on Feb. 21, 2014.

(51) Int. Cl.
| | | |
|---|---|---|
| *A41F 1/00* | (2006.01) | |
| *A41F 9/00* | (2006.01) | |
| *A44B 11/04* | (2006.01) | |
| *B60P 7/08* | (2006.01) | |

(52) U.S. Cl.
CPC .............. *A41F 1/002* (2013.01); *A41F 9/002* (2013.01); *A44B 11/04* (2013.01); *B60P 7/0823* (2013.01); *Y10T 24/2192* (2015.01); *Y10T 29/49826* (2015.01)

(58) Field of Classification Search
CPC .......... A41F 1/002; A41F 9/002; A41B 11/04; B60P 7/0823; Y10T 24/2192
See application file for complete search history.

(56) References Cited

U.S. PATENT DOCUMENTS

| | | |
|---|---|---|
| 4,453,294 A | 6/1984 | Morita |
| 4,480,361 A | 11/1984 | Morita |
| 5,560,089 A | 10/1996 | Morita |
| 5,604,960 A | 2/1997 | Good |
| 5,987,715 A | 11/1999 | Khon |
| 7,373,696 B2 | 5/2008 | Schoenig et al. |
| 7,398,559 B2 | 7/2008 | Flatt |
| 7,412,730 B2 | 8/2008 | Schroeder |
| 7,793,518 B1 | 9/2010 | Holleman |
| 7,817,002 B2 | 10/2010 | Fullerton et al. |
| 8,316,515 B2 | 11/2012 | Slank |
| 8,353,064 B2 | 1/2013 | Tagatz |
| 8,474,108 B2 | 7/2013 | Eisenberger |
| 8,640,266 B2 | 2/2014 | Best et al. |
| 2005/0102802 A1* | 5/2005 | Sitbon ..................... A41F 1/002 24/303 |
| 2008/0104742 A1 | 5/2008 | Alperin et al. |

(Continued)

*Primary Examiner* — Robert Sandy
*Assistant Examiner* — Michael S Lee (57) ABSTRACT

A fastening module is used to attach a first end of a first material to a second end of a second material to form a strap. The fastening module has a first attachment feature and a second attachment feature. The first end is attached to the first attachment feature. The second end is attached to the second attachment feature by wrapping the second end around a bar-like feature. The second end comprises a non-slidable magnetically attractive material near its tip and a slideable magnetically attractive material further from the tip. The tip of the second end is wrapped around the bar like feature and engages with the slidable magnetically attractive material to secure the strap. Adjustment of the strap can be accomplished by sliding the slidable magnetically attractive element.

19 Claims, 7 Drawing Sheets

(56) References Cited

U.S. PATENT DOCUMENTS

| | | | |
|---|---|---|---|
| 2009/0193675 A1* | 8/2009 | Sieber | A41H 1/02 33/759 |
| 2011/0083254 A1 | 4/2011 | Trutna et al. | |
| 2011/0119813 A1 | 5/2011 | Nate | |
| 2012/0097812 A1 | 4/2012 | Zampelli | |
| 2012/0180197 A1 | 7/2012 | Cosky | |
| 2012/0216374 A1 | 8/2012 | Manuello | |
| 2013/0205476 A1 | 8/2013 | Gentile et al. | |
| 2016/0088885 A1* | 3/2016 | Campbell | A41D 13/04 2/51 |

* cited by examiner

MAGNET AND FRICTION BASED INFINITELY VARIABLE STRAP TIGHTENING SYSTEM AND METHOD

This application claims benefit of U.S. Provisional Patent Application Ser. No. 61/942,702 filed 21 Feb. 2014, the entire disclosures of which are incorporated by reference herein.

BACKGROUND

The present invention relates to buckles, buttons, clasps, clamps, and other systems used to attach two pieces (or two ends) of flexible material, such as fabric, leather, straps, chains, ropes, etc.

One example of a field of use is belts. Traditional belts have a strap with holes on one end and a clasp on the other end. The clasp includes a pin that goes through one of the holes to secure the belt at a fixed length. Belt holes become worn and frayed over time and the belt itself can develop a crease from constant folding and unfolding. Moreover, the size of the belt is limited to the number and location of the holes in the one end. Those belt holes are at discrete locations. There are belts incorporating clamps that grasp at an infinitely variable number of points and there are many other ways of holding two pieces or to ends of flexible material together such as VELCRO™ or a pair of rings that the end of a strap is threaded through and tightened and held using friction. However, these prior art infinitely variable tightening systems can have drawbacks such as their use of materials that can fray or wear easily, thereby creating or holding dust. These prior art tightening systems can also have a non-optimal appearance. These prior art tightening systems can have cost or ease of use limitations. These prior art-tightening systems can make noise when they are opened, closed, or moved.

There are prior art devices that use magnets as part of the clasping system. These prior art devices typically have two magnets at fixed locations or a magnet and a magnetically attractive element at fixed locations. These prior art magnetic tightening systems typically do not provide a closure that can be adjusted to an infinitely variable set of positions. Embodiments of the present invention overcome these limitations by providing a novel magnet-based infinitely variable system for tightening a strap or similar piece of flexible material that has two pieces or two ends.

BRIEF DESCRIPTION OF THE DRAWINGS

The present disclosure is described in conjunction with the appended figures in which.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It should be understood that various changes could be made in the function and arrangement of elements without departing from the spirit and scope as set forth in the appended claims.

Specific details are given in the following description to provide a thorough understanding of the embodiments. However, it will be understood by one of ordinary skill in the art that the embodiments may be practiced without these specific details. For example, shapes and geometries may be shown generically and details may be left out in order not to obscure the embodiments in unnecessary detail.

Figure 1A:
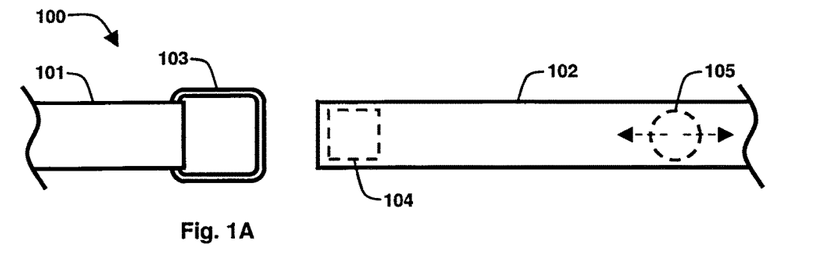
FIG. 1A shows a strap assembly prior to threading a second end through a fastening module attached to a first end.
Figure 1B:
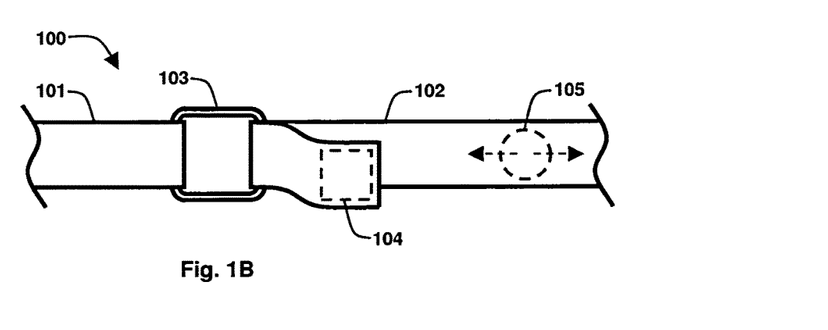
FIG. 1B shows the strap assembly as the second end is threaded through the fastening module.
Figure 1C:
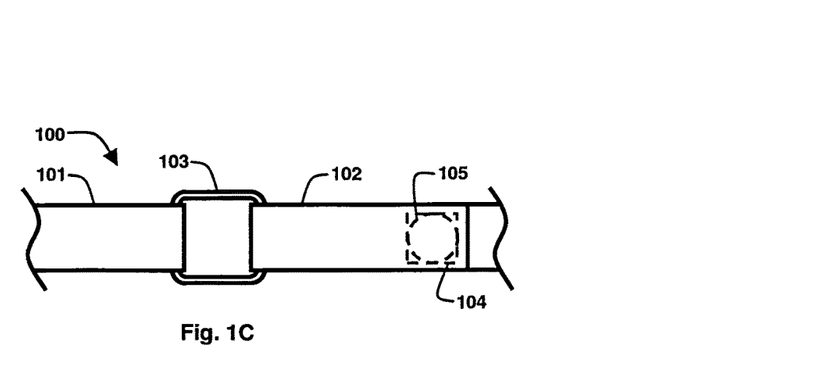
FIG. 1C shows the strap assembly after the second end is doubled back on itself and a fixed magnetically attractive element is secured to a slidable magnetically attractive element.

FIGS. 1A, 1B, and 10 show a strap assembly at 100. The strap assembly 100 comprises a first end, shown at 101, and a second end, shown at 102. The first end 101 and second end 102 can be part of the same strap, in which case the regions beyond the break lines could be connected, or the first end 101 and second end 102 could be part of two different straps (i.e. the first material used for the first end could be different than the second material used for the second end). There is a fastening module, shown at 103, attached to the first end 101. The fastening module shown at 103 comprises a rectangular loop (in this case, more specifically a square loop) with a central aperture. The first end 101 is attached to the fastening module 103 by threading the first end strap through the aperture. The tip of the second end 102 can be threaded through the fastening module 103, as shown by FIG. 1B.

Further referring to FIGS. 1A, 1B, and 1C, the second end 102 comprises a fixed magnetically attractive element, shown at 104, and a sliding magnetically attractive element, shown at 105. In one embodiment, the fixed magnetically attractive element, 104 is encapsulated between two layers of flexible material in a pocket in a region near the tip of the second end. One method for encapsulating this fixed magnetically attractive element 104 can be the use of two layers of woven nylon webbing that are sewn together on their top and bottom sides with a vertical sewn seam to prevent the fixed magnetically attractive element 104 from sliding horizontally along the length of the second end 102. Other methods of fabricating the fixed magnetically attractive element 104 into the second end 102 can be used and other flexible materials can be used in configurations capable of being understood by anyone knowledgeable in the art.

The second end 102 also comprises a slidable magnetically attractive element, shown at 105. In one embodiment, the slidable magnetically attractive element 105 is located further from the tip of the second end 102 than the location of fixed magnetically attractive element 104. In one embodiment, the slidable magnetically attractive element 105 is encapsulated inside of a horizontal cavity between two layers of flexible material with boundaries near the top and bottom of the second end 102. One method of fabricating the bounded horizontal cavity would be the use of two layers of nylon webbing that are sewn together on their top and bottom sides without having any vertical sewn seams, allowing the slidable magnetically attractive element 105 to slide horizontally. Other methods of fabricating the fixed magnetically attractive element 104 and the slidable magnet into the second end 102 can be used and other flexible materials can be used in configurations capable of being understood by anyone knowledgeable in the art.

FIG. 1C shows the strap when the fixed magnetically attractive element 104 and the slidable magnetically attractive element 105 are on top of one another. The second end 102 can be tightened by using attraction of the two magnetically attractive elements, 104 and 105, to move the slidable magnetically attractive element 105 in the bounded horizontal cavity. The sliding friction of the flexible material that separates the two magnetically attractive elements, 104 and 105, prevents the strap from loosening once the second end 102 has been secured. By selecting the strength of attraction of the magnetically attractive elements, 104 and 105, and the roughness of the flexible material used for the second end 102, one can make configurations of the tightening system 100 that work for various applications.

The amount of longitudinal force that embodiments of the variable strap tightening system can hold is a function of:
 (a) magnetic pull of the magnetically attractive elements;
 (b) the coefficient of friction (mu) of the materials that would need to slide in order to respond to the longitudinal force; and
 (c) any other friction elements, pulleys, or "pulley-like" features in the system that amplify or reduce forces based on engineering mechanics principles capable of being understood by anyone skilled in the arts.

Mu is a function of the materials that would need to slide, and whether there are any lubricants between these materials. Mu can also be different depending upon whether static friction (prior to movement) or dynamic friction (after movement) is being measured. Static friction can also be called static mu. Dynamic friction can also be called kinetic friction or sliding mu. Typical values for mu (with no lubricants) are shown in the table below:

| MATERIAL 1 | MATERIAL 2 | STATIC MU | SLIDING MU |
| --- | --- | --- | --- |
| Teflon (PTFE) | Teflon (PTFE) | 0.04 | 0.04 |
| Graphite | Graphite | 0.1 | 0.1 |
| Nylon (smooth) | Nylon (smooth) | 0.15-0.25 | 0.15-0.25 |
| Nylon (webbed belt) | Nylon (webbed belt) | 0.4-1.0 | 0.4-1.0 |

-continued

| MATERIAL 1 | MATERIAL 2 | STATIC MU | SLIDING MU |
| --- | --- | --- | --- |
| Leather | Clean metal | 0.6 | 0.4 |
| Iron | Iron | 1.0 | 1.0 |
| Aluminum | Aluminum | 1.05-1.35 | 1.4 |
| Rubber | Steel | 1.0-4.0 | 1.0-4.0 |

Embodiments of the present invention can take the form of a variety of straps. A belt is one example of a strap in which the first end 101 and the second end 102 are part of the same material. Belts are commonly worn around the waist of a person. Straps can have the first end 101 and second end 102 be part of the same material or the first and second ends can be different materials and these different materials can either be connected to one another somewhere other than the first end 101 and the second end 102 or they can be used to attach two separate items together by attaching the first end 101 to the second end 102. Further examples of straps can include bag and courier straps, backpack straps, yoga straps, utility straps used to tighten things down, helmet straps, bra straps, guitar straps, dog collars, medical straps such as those used to help brace a back, headlamp straps, knee straps, straps to tighten a hat or cap such as those used on a baseball cap, straps to hold on a an apron, watch bands, arm bands, organizer straps for hanging things like a coil or rope, straps on a boot, or any other kind of strap capable of being understood by anyone skilled in the art.

Figure 2:
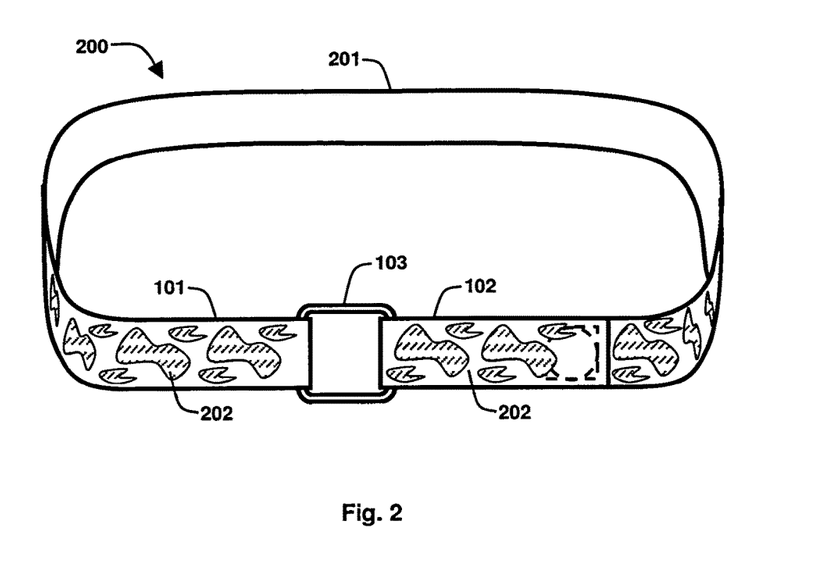
FIG. 2 shows a hunting belt.

The configuration shown in FIGS. 1A, 1B, and 1C can be part of a variety of embodiments used in a variety of applications. One embodiment and application can be a belt used for hunting, shown at 200 in FIG. 2. When used in this application, the belt using magnetically attractive elements has the advantage that little or no noise is produced when the belt is put on, taken off, tightened or loosened. One benefit of low noise is that animals will not be scared away. As shown by FIG. 2, the first end 101 and the second end 102 are part of the same strap material, shown at 201. In this configuration, the strap material 201 can have a camouflage pattern, shown at 202. This camouflage pattern 202 can be printed on the belt or added to the belt using any technology cable of being understood by anyone skilled in the art. It is especially desirable to have this camouflage pattern 202 on the visible outside of the belt and on the inside of the strap material on the second end 102 if the belt is to be worn with the second end 102 looping to the outside through the fastening module 103.

Figure 3:
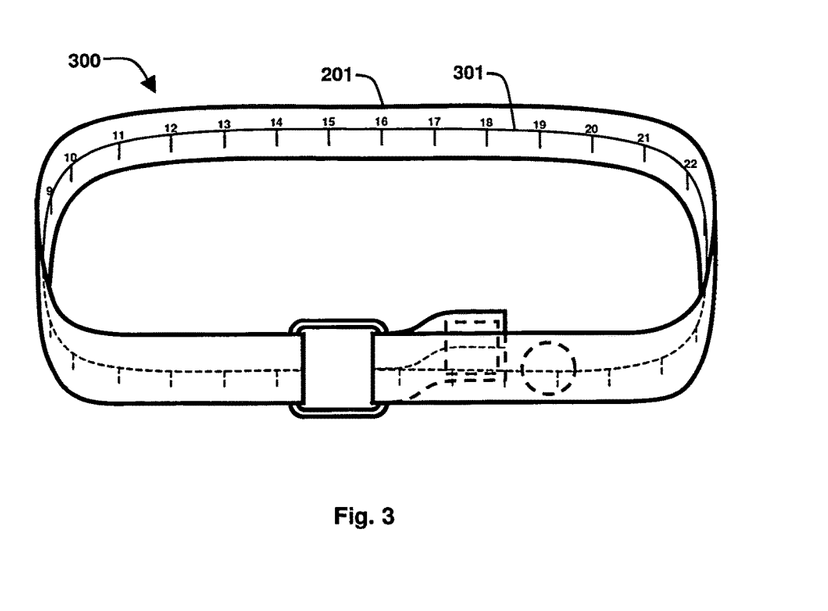
FIG. 3 shows a weight loss belt.

Another embodiment and application can be a weight loss belt shown at 300 in FIG. 3. The weight loss belt can comprise a linear measurement scale (such as that found as part of a tape measure), shown at 301. The linear measurement scale 301 can be on the inside surface of the strap material 201 so that the linear measurement scale 301 is not visible when the belt has been tightened, but can be seen during the tightening process, by looking inside the belt. The linear measurement scale 301 can be printed on the belt. The linear measurement scale 301 could be part of a separate item (such as a tape measure) that is attached to the belt. When used as a belt, the configuration shown in FIGS. 1A, 1B, 1C, and 2 can have a large range of adjustment from a small size to one that is almost two times as long. This can be useful in applications such as when used as a pregnancy belt. The belt can gradually be loosened as the abdomen expands. When used in conjunction with a linear measurement scale 301, the belt can be used to track the expansion of the abdomen during pregnancy. The linear measurement scale 301 can be used for many applications other than weight loss, such as measuring the distance between two points—one example of which would be to remove the belt shown in FIG. 3 and use the linear measurement scale to measure the size of a fish.

Figure 4:
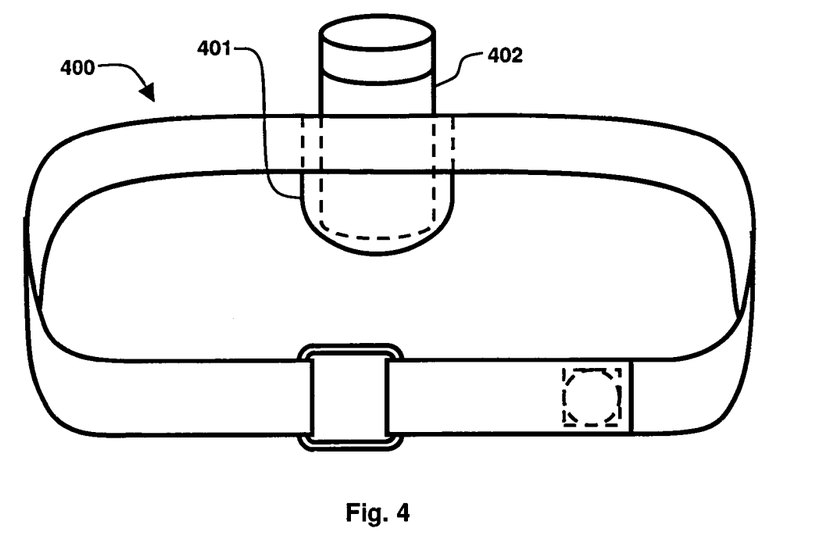
FIG. 4 shows a carrier belt.

Another embodiment and application can be as a carrier belt or carrier strap shown at 400 in FIG. 4. Such carrier belts (or carrier straps) 400 can further comprise holders for things such as water, water bottles, tools, portable electronic devices, and many other types of items that a person might want attached to themselves that are capable of being understood or implemented by anyone skilled in the art. The carrier belt 400 comprises a water bottle holder, shown at 401 that holds a water bottle, shown at 402. Variations can include a carrier belt around one's waist, a carrier strap held on one's arm, and a hidden gun holder under a wearer's baggy pant leg.

The strap material shown at 201 in FIGS. 2 and 3 and the first end 101 and second end 102 shown in FIGS. 1A, 1B, and 1C can be fabricated from variety of materials. In one embodiment, the strap material 201 is made of woven nylon webbing. The strap can be made of other types of woven and nonwoven fibrous material. The strap can be made of a thin strip of plastic that could have been extruded, cut from a blown film, or made using any fabrication process capable of being understood by anyone skilled in the art. The strap can be made of non-ferrous metal. The strap can be made of leather or other animal-derived materials including cat gut. The strap can be made of plant-derived material. The strap can be a single color. The strap can be in multiple decorative colors. The strap can carry printing. The printing can include symbols, letters, numbers, and other characters. The printing can include photos. The printing can include illustrations. The printing can look like a flag.

Figure 5:
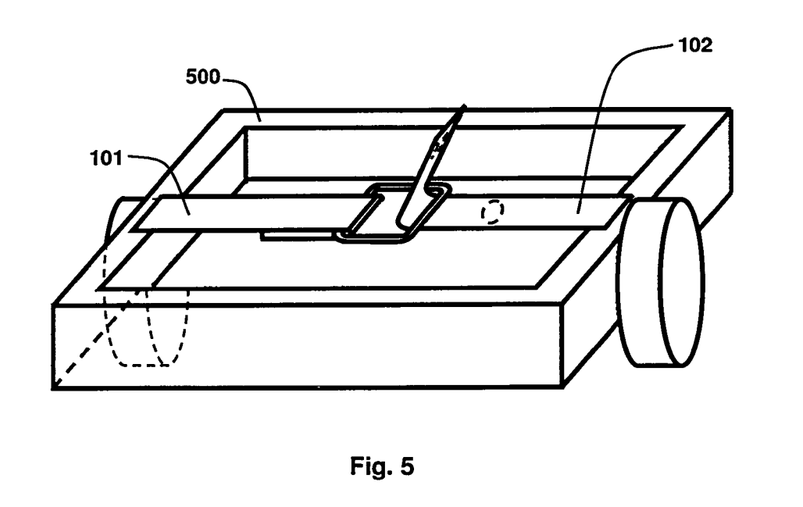
FIG. 5 shows a strap attached to a trailer.

FIG. 5 shows a strap attached to a trailer. The trailer is shown at 500. The first end of the strap is shown at 101. The second end of the strap is shown at 102. These two ends of the strap, 101 and 102, are similar to the configuration shown in FIG. 1A, FIG. 1B, and FIG. 1C and illustrate that the material for the first end 101 can be different than the material for the second 102. Thus, it is possible to use embodiments of the present invention to attach two items together in any configuration capable of being understood my anyone skilled in the art. Examples might be straps on backpacks or similar carrying devices, straps for lifting an engine out of a car, straps for holding a tarp over items in the back of a pickup truck, straps for fastening an article of footwear (such as a ski boot), suspenders to hold up a pair of paints, bra straps, straps for fastening boots to snow shoes, and straps used in rock climbing.

Figure 6A:
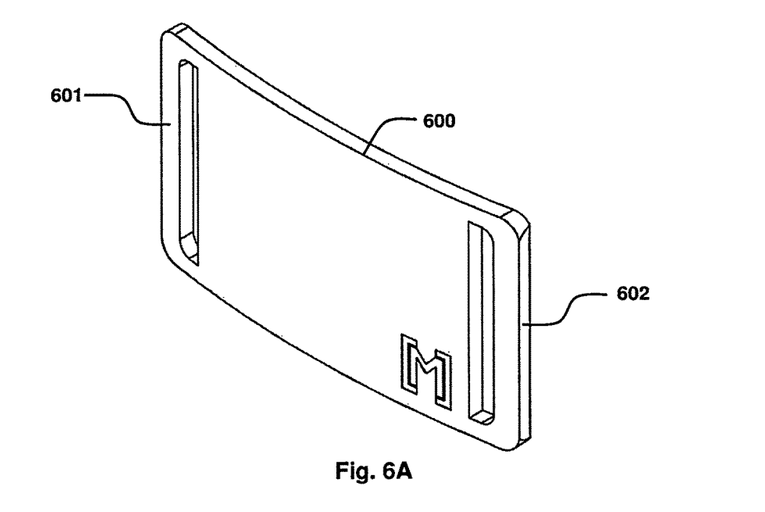
FIG. 6A shows a second fastening module.

The fastening module, previously shown as 103 in FIGS. 1A, 1B, and 1C can have a variety of shapes and configurations and can be made of a variety of materials. The fastening module can also be interchangeable from one tightening system to another. FIG. 6A shows a second fastening module, 600, in the form of a curved (body-fitting) plate with a first attachment feature, shown at 601, and a second attachment feature, shown at 602. The first attachment feature 601 comprises a slot in the fastening module 600 that can be used to attach the first end, 101 in FIG. 1A. When the first attachment feature 601 is used to directly attach the first end 101, the second fastening module can substitute for the fastening module 103, shown in FIG. 1A.

Figure 6B:
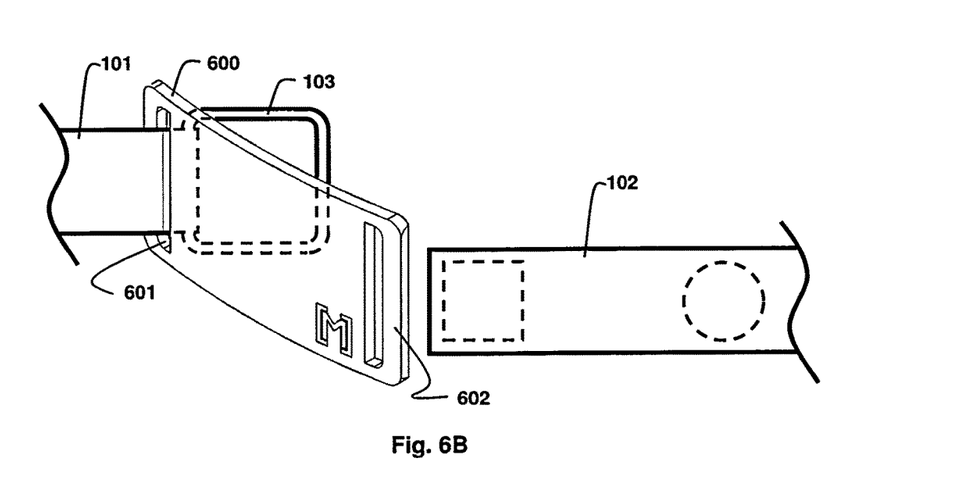
FIG. 6B shows a second fastening module used in conjunction with a first fastening module.

Referring to FIG. 6B, the second fastening module 600, can also be used in conjunction with the first fastening module, 103, that was previously shown in FIG. 1A. When used in this configuration, the second fastening module 600 can be used as a decorative belt buckle. In this configuration, the strap assembly that was shown in FIG. 1A, FIG. 1B, and FIG. 1C is threaded through the slot in the first attachment feature 601 and pulled until the first fastening module 103 rests against the back of the second fastening module 600.

Referring to FIG. 6A and FIG. 6B, the second attachment feature 602 comprises a vertical bar-like attachment member that can be used to attach the second end, shown at 102. Note that the bar in the bar-like attachment member 602 does not need to be a straight bar, it can also be curved. This second fastening module 600 could be made out of a stamped metal. The metal could be aluminum. The metal could be brass. The metal could be silver. The metal could be titanium. The fastening module could be machined. The fastening module could be laser cut, flame cut, plasma cut, or water jet cut. The fastening module could be etched. The fastening module could be made out of plastic. The fastening module could be made out of wood. The fastening module could be made out of bone. The fastening module could be made out of a seashell. The fastening module could be made out of coconut. The fastening module could be made out of tagua nut (genus *Phytelaphas*). The fastening module could be made out of any other material using any fabrication method capable of being understood by anyone skilled in the art.

Figure 7:
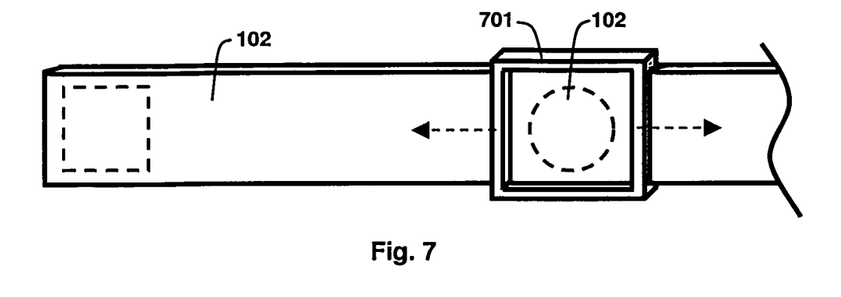
FIG. 7 shows a second end further comprising an external slider over the sliding magnet.

FIG. 7 illustrates a second end, shown at 102, further comprising an external slider, shown at 701, over the region of the sliding magnetically attractive element, shown at 105. One of the benefits of incorporating an external slider 701 is that it makes it easier to find the location of the sliding magnetically attractive element 105. Another benefit is that the magnetically attractive element 105 may be moved by moving the external slider 701 longitudinally along the second end 102. The external slider 701 can be made of any non-magnetically attractive material in any configuration capable of fitting over the second end 102 and capable of being understood by anyone skilled in the art.

Figure 8A:
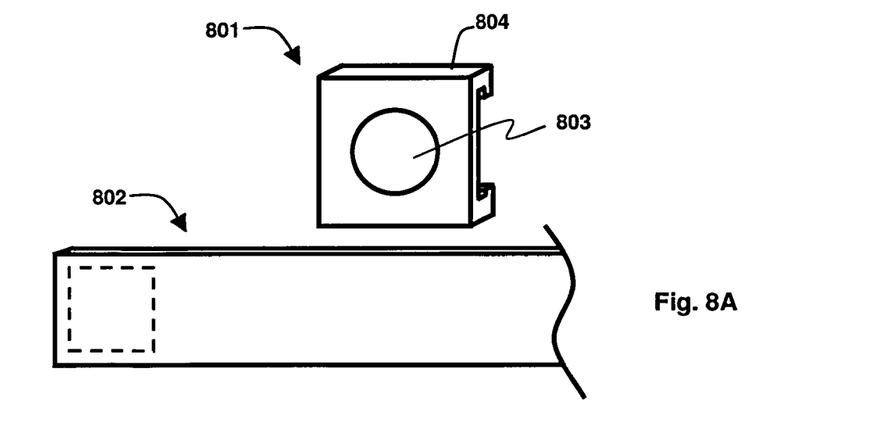
FIG. 8A shows an external sliding magnetically attractive module and an alternate configuration second end.
Figure 8B:
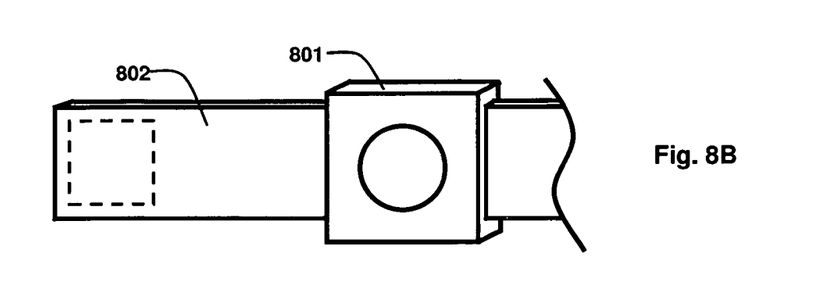
FIG. 8B shows an external sliding magnetically attractive module slidably attached to the alternate configuration second end.

FIG. 8A shows an external sliding magnetically attractive module, at 801, and an alternate configuration second end, at 802. The external sliding magnetically attractive module 801 comprises an alternate magnetically attractive element, shown at 803, and an external magnetically attractive element holder, shown at 804. FIG. 8B shows the same external sliding magnetically attractive module 801 after it has been attached to the outside of the alternate configuration second end 802. Referring to FIG. 8A and FIG. 8B, the alternate configuration second end 802 is different from the second end shown at 102 in FIG. 1A, FIG. 1B, and FIG. 1C in that the alternate configuration second end 802 does not need to incorporate a sliding magnetically attractive element 105 inside of the second end 102.

Referring back to FIG. 1A, FIG. 1B, and FIG. 1C, it should be noted that only one of the two magnetically attractive elements, 104 or 105, must be a magnetic. The other magnetically attractive element only needs to be a magnetically attractive material. The magnet that is magnetic, 104 or 105, can be a permanent magnet or this magnet can be an electromagnet with an electrical power source. Examples of the types of materials used in permanent magnets for embodiments of the present invention can include iron, nickel, cobalt, and rare earth (lanthanide) elements having atomic numbers from 57 to 71 such as lanthanum, cerium, praseodymium, neodymium, samarium, europium, gadolinium, terbium, dysprosium, holmium, erbium, thulium, ytterbium, and lutetium. Permanent magnets used in embodiments of the present invention can also comprise ceramics such as sintered powdered iron oxide with barium/strontium carbonate, sintered or cast aluminum/ nickel/cobalt with iron and small amounts of other materials (typically called Anico, Alni, Alcomax, Hycoma, Columax, or Ticonal). Some examples of permanent magnetic materials that use rare earth metals are samarium-cobalt and neodymium-iron-boron (also known as neodymium magnets or, NdBeB, NIB, or Neo magnets). Examples of magnetically attractive materials can include iron, nickel, and cobalt.

A magnet can be either a permanent magnet or an electromagnet. Magnetic pull force (also described in this document as the "magnetic attractiveness") can exist between two magnets or between a magnet and a second material that is not a permanent magnet, not configured as an electromagnet, and yet is magnetically attracted to a magnet. Such second materials are called magnetically attractive materials in this disclosure. Thus, in this disclosure we can talk about three distinct types of materials: "magnets", "magnetically attractive materials", and materials that are neither magnets or nor magnetically attractive, which are called "non-magnetically attractive materials" in this disclosure. Magnetic pull force in a particular configuration is a function of:

(1) whether the configuration uses two magnets or a magnet and a magnetically-attractive material;
(2) the strength of the magnets (or magnet if this is a configuration with a magnet and a magnetically attractive material);
(3) the geometric shape of the magnets (or magnet if this is a configuration with a magnet and a magnetically attractive material);
(4) the size of the magnets (or magnet if this is a configuration with a magnet and a magnetically attractive material);
(5) the distance between the magnets (or magnet if this is a configuration with a magnet and a magnetically attractive material); and
(6) the composition of the of the magnetically attractive material if this is a configuration with a magnet and a magnetically attractive material.

Maximum energy product, typically called BHmax, (and typically measured in Mega-GaussOersted) is a commonly used measure of the strength of a permanent magnet. For many types of magnets, the grade of the material provides information of the maximum energy product as measured in Mega-GaussOersted (MGOe). For example, a sintered neodymium-iron-boron permanent magnet that has a grade of N28 has a maximum energy product (BHmax) of approximately 28 MGOe. Typical commercial grades of sintered neodymium-iron-born permanent magnets can have BHmax values ranging from 28 MGOe (grade N28) to 52 MGOe (grade N52). Typical bonded neodymium-iron-boron permanent magnets have BHmax values ranging from 4 MGOe (grade BDM-4) to 12 MGOe (grade BDM-12). Typical samarium-cobalt permanent magnets have BHmax values ranging from 18 MGOe (grade YX18) to 30 MGOe (grade YXG30B). Typical aluminum-nickel-cobalt permanent magnets have BHmax of 1.13 MGOe (grade LN9) to 9 MGOe (grade LNGT72). Typical ceramic ferrite permanent magnets have a BHmax of 1.05 MGOe (grade C1) to 4.3 MGOe (grade C11). Typical flexible rubber permanent magnets made by mixing ferrite or neodymium magnet powders and synthetic or natural rubber binders have a BHmax ranging from 0.6 MGOe (grade FRM-5) to 1.55 MGOe (grade FRM-12).

Figure 9A:
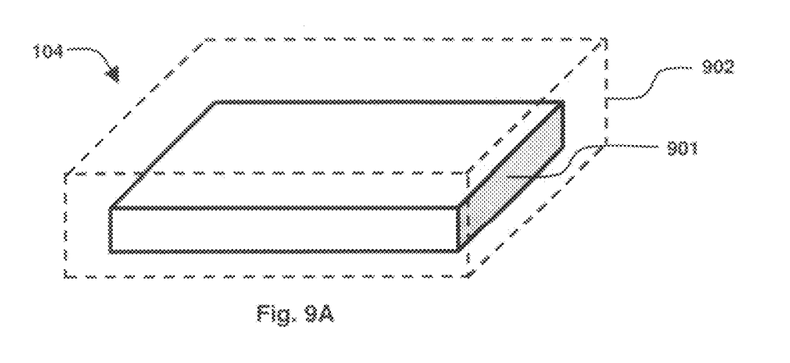
FIG. 9A shows an isometric view of a magnet covered by a mu-metal.
Figure 9B:
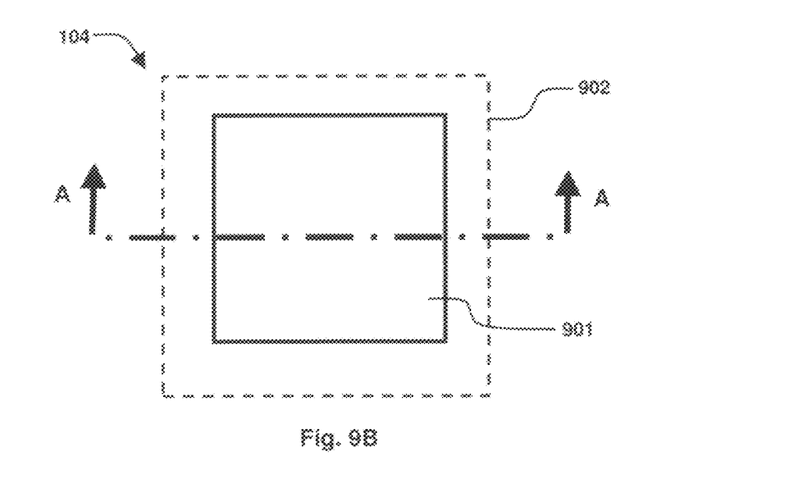
FIG. 9B shows a bottom view of the magnet covered by a mu-metal depicted in FIG. 9A.
Figure 9C:
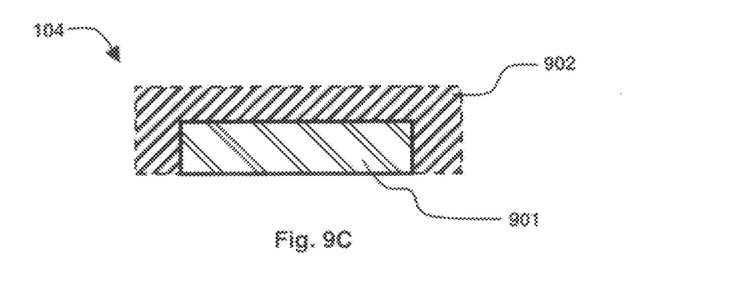
FIG. 9C shows a view of Section A-A of the magnet covered by mu-metal of FIG. 9B.

The magnetically attractive elements, 104 and/or 105 (and 803 in FIG. 8A) (and 803 in FIG. 8A), can be coated or shielded with a material that demagnetizes one side so that items would not stick to the belt or strap. Mu-metals have a high magnetic permeability and are named mu-metals because mu is the Greek letter used to specify magnetic permeability. Mu-metals can be composed of a nickel-iron alloy, such as one that has 77% nickel, 16% iron, 5% copper, and 2% chromium or molybdenum. Mu-metals can also be composed of other materials, examples of which include Co-Netic, supermalloy, supermumetal, nilomag, sanbold, molybdenum permaloy, Sendust, M-1040, Hipernom, HyMu-80, and amumetal. FIG. 9A, FIG. 9B, and FIG. 9C show a configuration and method for shielding a rectangular magnet. FIG. 9A is an isometric view. FIG. 9B is a bottom view. FIG. 9C is a view of section A-A of FIG. 9B. In FIG. 9A, 9B, and FIG. 9C, a fixed rectangular magnetically attractive element is shown at 104. This fixed rectangular magnetically attractive element is the same as 104 in FIG. 1A, FIG. 1B, and FIG. 1C. The fixed magnetically attractive element comprises a rectangular permanent magnet, shown at 901 and a magnetic shield, shown in dotted lines at 902. The magnetic shield 902 can be composed of a mu-metal and the mu-metal can be any thickness and can be attached to any surface of any permanent magnet 901. The permanent magnet 901 can be of any shape or size and can comprise any magnetic material capable herein disclosed or capable of being understood by anyone skilled in the art.

Figure 10A:
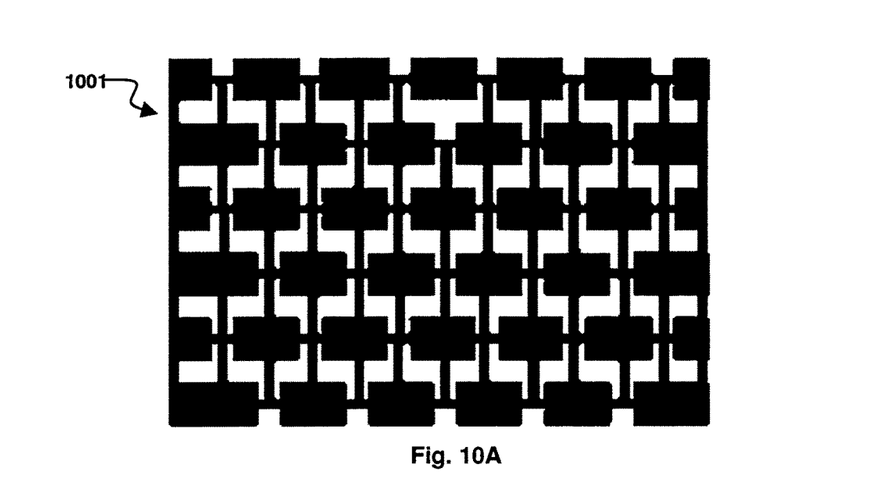
FIG. 10A shows a geometrically flexible configuration of a magnetically attractive element.
Figure 10B:
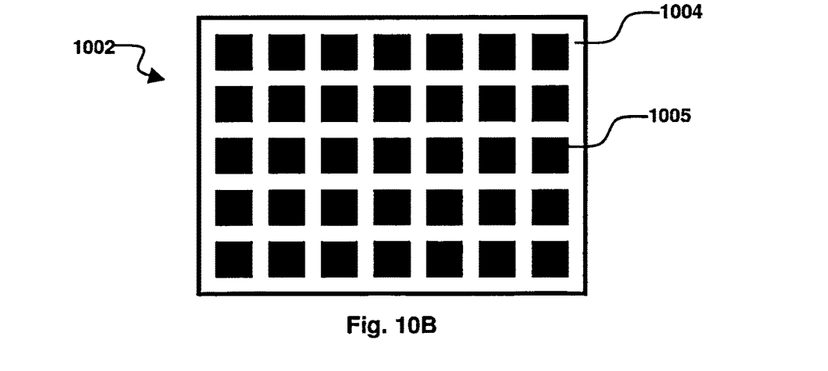
FIG. 10B shows a plastic molded configuration of magnetically attractive pieces.
Figure 10C:
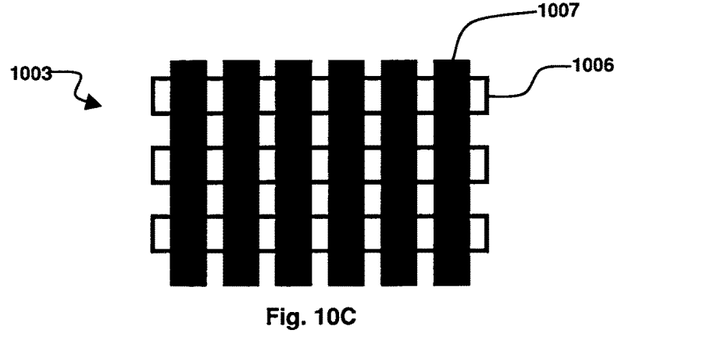
FIG. 10C shows a taped configuration of magnetically attractive pieces.

The magnetically attractive elements, 104 and 105, shown in FIGS. 1A, 1B, and 1C can have a variety of shapes and configurations. The magnetically attractive elements, 104 and/or 105 (and 803 in FIG. 8A), can be liquid or solid. One or both of the magnetically attractive elements, 104 and/or 105 (and 803 in FIG. 8A), can be monolithic. One or both of the magnetically attractive elements, 104 and/or 105 (and 803 in FIG. 8A), can be comprise a plurality of magnetic pieces that are mechanically attached to one another in a way that improves flexibility or provides other desirable attributes. Methods for improving flexibility can include a geometrically flexible configuration, shown at 1001 in FIG. 10A, a plastic molded configuration shown at 1002 in FIG. 10B, and a taped configuration shown at 1003 in FIG. 10C. In the geometrically flexible configuration 1001, the magnetically attractive piece is monolithic, but comprises larger blocks attached through narrower sections that enhance flexibility. The geometrically flexible configuration 1001 can be fabricated using an etching process, a laser cutting process, a water jet cutting process or any other process capable of being understood by anyone skilled in the art. One method for creating the plastic molded configuration 1002 is the placement of multiple magnetically attractive pieces, shown at 1005, into a binder material, such as plastic, shown at 1004 using any process capable of being understood by anyone skilled in the art, such as casting, injection molding, and vacuum forming. The taped configuration 1003 can be created by taking multiple magnetically attractive pieces, shown at 1007, and attaching these pieces together using an adhesive on a substrate, shown at 1006.

The magnetically attractive elements, 104 and/or 105 in FIG. 1A, FIG. 1B, and FIG. 1C, and 803 in FIG. 8A, can be solid or hollow. The magnetically attractive elements, 104, 105 and/or 803, can be stiff or flexible. The magnetically attractive elements, 104, 105 and/or 803, can be in the shape of a substantially cylindrical flat disk. The magnetically attractive elements, 104, 105 and/or 803, can be in the shape of a flat square. The magnetically attractive elements, 104, 105 and/or 803, can be in the shape of a flat rectangle. The magnetically attractive elements, 104, 105 and/or 803, can comprise spheres, cylinders, squares, hexagons, balbis-shapes, nonagons, octagons, vesica pisces, lemniscates, or any other shape or configuration capable of being understood by anyone skilled in the art.

Benefits of embodiments of the present invention can include:
(1) Little or no noise when strap is tightened or loosened;
(2) Little or no wear or fraying of any of the components;
(3) Fast and easy to use;
(4) Can be used with gloves on;
(5) Can be used without needing to see strap (self fastening when magnetically attractive elements get close);
(6) Ability to fit an infinite number of continuously variable positions;
(7) Fastening materials (i.e. magnetically attractive materials) may be embedded in other materials to reduce potential for contamination, etc;
(8) Limits of magnetic pull force can serve as a safety release;
(9) Potential for shielding the magnets in a mu metal;
(10) Attractive appearance;
(11) Low cost; and
(12) Adaptability to a large number of colors, patterns, configurations, and sizes.

A further number of variations and modifications of the disclosed embodiments can also be used. The principles described here can also be used for in applications other than attachment systems. While the principles of the disclosure have been described above in connection with specific apparatuses and methods, it is to be clearly understood that this description is made only by way of example and not as limitation on the scope of the disclosure.

I claim:

1. An infinitely variable strap tightening system, the system comprising:
    a first end of a first flexible non-magnetically attractive material;
    a second end of a second flexible non-magnetically attractive material;
    a first fastening module and a second fastening module wherein:
        the first fastening module comprises a loop that surrounds an aperture;
        the first end is attached to the loop;
        the second fastening module comprises a first attachment feature and a second attachment feature;
        the first attachment feature comprises a first slot;
        the first material is threaded through the first slot;
        the loop is retained against one side of the second fastening module; and
        the second attachment feature comprises a second slot and a bar-like attachment member wherein the second material threads through the second slot and wraps around the bar-like attachment member when the strap tightening system is in use;
    a non-slideable magnetically attractive element fixedly encapsulated in the second material near the tip of the second end; and
    a slideable magnetically attractive element captured within the second material in a manner that allows the slideable magnetically attractive element to move longitudinally along the second material while preventing the slideable magnetically attractive element from moving transversally in the second material, the slideable magnetically attractive element being captured in a region where the non-slideable magnetically attractive element and the slideable magnetically attractive element can be magnetically attracted to each other once the second end has been wrapped around the bar-like attachment member in the second fastening module and the non-slideable magnet in the second end is located proximate to the second material in a region proximate to the slideable magnetically attractive element.

2. The system of claim 1 wherein:
the first material comprises woven nylon webbing;
the second material comprises woven nylon webbing;
the first material and the second material are a single piece of the same material, which makes the first end and the second end the two ends of a single strap comprising woven nylon webbing;
the second fastening module comprises a material selected from the group of metal, plastic, wood, bone, sea shell, coconut, and tagua nut;
the slideable magnetically attractive element is in the shape of a substantially round flat disk;
the slideable magnetically attractive element comprises iron;
the non-slideable magnetically attractive element comprises neodymium; and
the non-slideable magnetically attractive element comprises a mu-metal wherein the mu-metal further comprises nickel, iron, and copper.

3. The system of claim 2 wherein:
the system further comprises a water bottle holder;
the single strap further comprises printing;
the printing further comprises a linear measurement scale;
the second fastening module is curved;
the second fastening module comprises tagua nut;
the second fastening module is fabricated using a laser cutting process;
the non-slideable magnetically attractive element further comprises boron and iron; and
the non-slideable magnetically attractive element is balbis-shaped.

4. The system of claim 1 wherein:
the first fastening module loop comprises a substantially rectangular shape surrounding a substantially rectangular aperture;
the first material and the second material are a single piece of the same material.

5. The system of claim 1 wherein:
the slideable magnetically attractive element is in the shape of a substantially round flat disk.

6. The system of claim 1 wherein:
the slideable magnetically attractive element comprises iron.

7. The system of claim 1 wherein:
the non-slideable magnetically attractive element comprises neodymium.

8. The system of claim 1 wherein:
the non-slideable magnetically attractive element comprises a mu-metal; and
the mu-metal further comprises nickel, iron, and copper.

9. The system of claim 1 wherein:
the system further comprises a holder for a device selected from the group of a water bottle, a tool, a portable electronic device, and a gun.

10. The system of claim 1 wherein:
the first material and the second material are a single piece of the same material;
the system comprises a belt;
the second fastening module comprises a belt buckle;
the belt further comprises printing;
the printing comprises a linear measurement scale; and
the system is used as a weight loss belt.

11. The system of claim 1 wherein:
the first and second materials further comprises printing;
the printing is in multiple colors;
the printing comprises a camouflage pattern.

12. The system of claim 1 wherein the non-slideable magnetically attractive element comprises a plurality of magnets.

13. The system of claim 1 wherein:
the second fastening module is user removable and interchangeable from one tightening system to another.

14. The system of claim 1 wherein:
the system is reconfigurable in a second mode as a tightening system without the second fastening module by threading the second end through the loop of the first fastening module.

15. The system of claim 1 wherein:
one of the slideable magnetic element or the non-slideable magnetic element further comprises a magnetic shield wherein:
  the magnetic shield comprises a metal; and
  the magnetic shield is configured for altering the shape of the magnetic field surrounding the slideable or non-slideable magnetic element.

16. An infinitely variable belt comprising:
a first end of a first flexible non-magnetically attractive material;
a second end of a second flexible non-magnetically attractive material;
a first fastening module and a buckle wherein:
  the first fastening module comprises a loop that surrounds an aperture;
  the first end is threaded through the aperture and attached to the loop;
  the buckle comprises a first attachment feature and a second attachment feature;
  the first attachment feature comprises a first slot;
  the first material passes through the first slot;
  the first fastening module is retained against one side of the buckle; and
  the second attachment feature comprises a second slot and a bar-like attachment member wherein the second material threads through the second slot and wraps around the bar-like attachment member when the belt is in use;
a non-slideable magnetically attractive element fixedly encapsulated in the second material near the tip of the second end; and
a slideable magnetically attractive element captured within the second material in a manner that allows the slideable magnetically attractive element to move longitudinally along the second material while preventing the slideable magnetically attractive element from moving transversally in the second material, the slideable magnetically attractive element being captured in a region where the non-slideable magnetically attractive element and the slideable magnetically attractive element can be magnetically attracted to each other once the second end has been wrapped around the bar-like attachment member in the buckle and the non-slideable magnet in the second end is located proximate to the second material in a region proximate to the slideable magnetically attractive element.

17. The belt of claim 16 wherein:
the first material comprises woven nylon webbing;
the second material comprises woven nylon webbing;
the first material and the second material are a single piece of the same material, which makes the first end and the second end the two ends of a single strap comprising woven nylon webbing.

18. An infinitely variable strapping method, the method comprising the steps of:
establishing a first flexible non-magnetically attractive material;
establishing a second flexible non-magnetically attractive material;
fastening a loop to an end of the first material;
sliding the first material through a first slot of a buckle until the loop rests against one side of the buckle;
fastening an end of the second material to the buckle, wherein fastening an end of the second material comprises:
  threading the end of the second material through a second slot of the buckle;
  wrapping the end of the second material around a bar-like attachment member of the buckle;
a non-slideable magnetically attractive element fixedly encapsulated in the second material near the tip of the second end; and
a slideable magnetically attractive element captured within the second material in a manner that allows the slideable magnetically attractive element to move longitudinally along the second material while preventing the slideable magnetically attractive element from moving transversally in the second material, the slideable magnetically attractive element being captured in a region where the non-slideable magnetically attractive element and the slideable magnetically attractive element can be magnetically attracted to each other once the second end has been fastened to the fastening module and the non-slideable magnet in the second end is located proximate to the second material in a region proximate to the slideable magnetically attractive element.

19. The method of claim 18 wherein the slideable magnetically attractive element comprises a different material from the non-slideable magnetically attractive element.

* * * * *